Jan. 30, 1962

W. P. ISAACSON 3,018,839

ACOUSTIC WAVE WELL LOGGING SYSTEM

Filed Sept. 6, 1956

INVENTOR.
WALTER P. ISAACSON
BY
AGENT

Jan. 30, 1962 — W. P. ISAACSON — 3,018,839
ACOUSTIC WAVE WELL LOGGING SYSTEM
Filed Sept. 6, 1956 — 4 Sheets-Sheet 2

INVENTOR.
WALTER P. ISAACSON
BY
AGENT

Jan. 30, 1962   W. P. ISAACSON   3,018,839
ACOUSTIC WAVE WELL LOGGING SYSTEM
Filed Sept. 6, 1956   4 Sheets-Sheet 3

FIG. 3a.

INVENTOR.
WALTER P. ISAACSON
BY
AGENT

Jan. 30, 1962    W. P. ISAACSON    3,018,839
ACOUSTIC WAVE WELL LOGGING SYSTEM
Filed Sept. 6, 1956    4 Sheets-Sheet 4

FIG. 3b.

INVENTOR.
WALTER P. ISAACSON
BY

AGENT

United States Patent Office 3,018,839
Patented Jan. 30, 1962

3,018,839
ACOUSTIC WAVE WELL LOGGING SYSTEM
Walter P. Isaacson, Los Angeles, Calif., assignor, by mesne assignments, to Dresser Industries, Inc., Dallas, Tex., a corporation of Delaware
Filed Sept. 6, 1956, Ser. No. 608,359
17 Claims. (Cl. 181—.5)

This invention relates to apparatus and a mode for investigating physical characteristics of earth formations encircling a borehole penetrating the formations. More particularly, the invention relates to a method and apparatus for obtaining information about the acoustic wave-transmitting characteristics of such formations through acoustical and electrical operations and apparatus.

In the art of "logging" earth boreholes, that is, obtaining information concerning characteristics of the strata of the earth penetrated by such boreholes, it is well known that, in general, the velocity of acoustic waves through different types of earth formations varies over a wide range of velocities, and that the velocity of an acoustic wave in a given type of formation generally increases with increasing depth below the surface. Thus it is found to be possible, by comparisons of relative travel times of such waves in different kinds of rock, to establish criteria or standards by which measurements conducted at locations within a borehole of the travel time of acoustic waves in the several borehole-encircling formations may be interpreted or translated into data highly useful in studies conducted with a view toward ascertaining the presence or absence of petroleum, gas, water, minerals, or the like in the formations. The present invention comprehends a new mode and apparatus for conducting acoustic travel time and velocity investigations of earth formations penetrated by an earth borehole, which provide much more accurate measurements or "logs" than have hitherto been obtainable, and provide as well, data heretofore not available in acoustic investigation logs.

This application is a continuation-in-part of application Serial No. 521,973, filed July 14, 1955, and now abandoned.

It is known in the prior art to traverse through an extent of a fluid-filled earth borehole an apparatus including one or more acoustic wave transmitters and one or more acoustic wave receivers, all so arranged that an indication of the propagation of a sound wave from a transmitter and an indication of the reception of the wave by the receiver, or receivers, is presented at the surface of the earth for recording, whereby some measure or indication of the time of travel of the wave between the points of transmission and reception or between spaced-apart points of reception could be obtained. Due to the fact that in such apparatus the transmitter and receiver means are both necessarily spaced from the wall of the fluid-filled borehole and that the velocity of sound in fluid commonly encountered in boreholes is quite different from its velocity in rock, and also due to the fact that the receiver is in position to receive the propagated wave directly through the fluid, as reflected back and forth between the borehole wall and the apparatus, and as refracted and transmitted through the rock of the formation along various paths, considerable difficulty has been experienced in securing a desirable degree of distinctness in the indications provided at the surface of the earth. Also complicating the matter of obtaining accurate and reliable results is the difficulty of transmitting the electrical translations of the received acoustic waves to the surface of the earth, since the acoustic waves as detected at the receiver are of extremely complex character and the suspending conductor cable forms an electrical transmission medium of variable transmission characteristics. Other difficulties are presented by lack of uniformity in borehole diameter and consequent variability of the proportion of acoustic wave travel time through the borehole fluid to its travel time through the rock encircling the borehole. Further, apparently no means has been provided for giving, at the operating location outside the borehole, a current or running summation of the several travel time measurements whereby the total time for transversal of an acoustic wave along the entire traversed extent of formation alongside the borehole could be made readily available. That information would be of considerable value in correlation and borehole evaluation studies. Various systems have been proposed for overcoming the difficulties mentioned, but none has so far provided fully satisfactory results.

In view of the above-stated and other well known undesirable features of prior art acoustic logging systems, it is a principal object of the present invention to provide an acoustic logging system free in large measure of such objectionable features.

It is another object of the invention to provide an acoustic logging system which presents to the operator an accurate integration of the time intervals required for an acoustic wave to travel through respective successive continuous sections or increments of the rock alongside and forming a borehole wall, whereby the total travel time of an acoustic wave along the logged extent of rock next adjacent the borehole may readily be determined for seismic evaluations and comparisons.

Another object of the invention is to provide an acoustic logging system in which effects of borehole diametral variations are minimized.

Another object of the present invention is to provide means for accurately measuring the travel time required for an acoustic wave to travel through an individual extent of unit length of borehole wall rock alongside an extent of borehole, to thus provide directly a measure of the acoustic velocity characteristic of the borehole-encircling rock. By unit length is meant a recognized unit of distance-measure, such as one foot, one yard, etc., or definite fraction thereof.

Another object of the invention is to provide means for accurately measuring and directly recording the travel time required for an acoustic wave to travel through each individual extent of unit length of borehole wall rock alongside an extent of borehole, to thus provide directly measures and records of the acoustic velocity characteristic of the borehole-encircling rock along the extent of borehole.

Another object of the invention is to provide means for accurately measuring and directly forming a record of the individual acoustic velocity characteristics of each of a series of successive contiguous increments or sections of borehole wall rock along an extent of borehole and concurrently measuring and forming a record of the summation of the acoustic wave travel times required for respective acoustic waves to travel through the series of successive sections of borehole wall rock along the same extent of borehole.

Additional objects and advantages to be hereinafter made evident, as well as those hereinbefore set out, are attained by the present invention, a preferred embodiment of which is disclosed in detail in this specification and the accompanying drawings forming a part thereof, in which drawings.

According to the concept of the present invention, a traverse or run is made through any desired portion or extent of an earth borehole, using borehole apparatus including an acoustic wave generator and first and second acoustic wave receivers or detectors, the arrangement being such that the two receivers are maintained substantially unit distance apart longitudinally of the borehole and such that each receiver is maintained at a constant respective distance from the acoustic wave generator, measured along the borehole. By unit distance is meant a distance equal to the beforementioned unit length. The electro-acoustic apparatus including the wave detectors and generator is, accordingly, adapted to be connected to and suspended from and traversed along or through the extent of bore hole by an end portion of a cable which may conveniently comprise electrical conductors serving to convey electric currents and/or signals between the suspended apparatus and an operating location outside the borehole above the surface of the earth. Suitable acoustic insulation is preferably provided between the three acoustic units. For example, these units may be separated by suitable lengths of chain through the links of which the insulated conductors are loosely intertwined; and if desired, one or more links of the chain may be maintained out of metallic contact with adjacent links by a coating of, for example, synthetic rubber. As the suspended apparatus is thus traversed along the extent of borehole, the acoustic wave generator is caused to produce an individual acoustic disturbance or wave at each of a plurality of levels or stations spaced unit distance apart as measurable longitudinally of the borehole. Thus a plurality, or series, of discontinuous individual acoustic waves is produced, one at each of the regularly spaced-apart levels or borehole stations. The locations of the stations in and along the borehole are not marked or characterized by any particular physical object, the stations being in a sense imaginary and defined only as the locations along the extent of borehole at which an acoustic wave is produced by the wave generator; however, the regular unit distance spacing of these locations is governed or effected by causing the generator to produce an acoustic wave each time the generator is lowered (or raised) an additional unit of distance from the previous station or location, as determined by measurement of cable pay-out or draw-in. The means for causing the generator to thus produce an acoustic wave at only each such level or station may be of various sorts and constructions, but in the preferred form of apparatus the wave generator is "triggered" or caused to produce such an individual acoustic wave by being supplied in each instance with an electric "triggering" signal through one or more conductors of the conductor cable employed to suspend and traverse the acoustic wave apparatus along the borehole. The electric triggering signals may each be the beginning or the termination of an alternating current supplied to the wave generator, or may be short pulses of current provided from a suitable source and individually supplied to the appropriate conductor and wave generator each time a unit length of the cable is paid into (or withdrawn from) the borehole by a cable winch or drum. A suitable source of electric triggering signals and its associated operating means will hereinafter be more specifically described.

The individual acoustic wave emanating from the wave generator travels away therefrom in substantially all directions, but may be severely damped in all directions except radially outwardly, by suitable acoustic wave dampers disposed to attain the desired effect. A portion of the energy of the wave is spent in travel of the wave upwardly and downwardly through the fluid, usually drilling mud, which fills the borehole. Another portion of the energy of the wave is consumed in reflections from the borehole wall. Some of the energy of the wave is expended in wave travel into and through the rock or earth encircling the borehole, where refraction and reflection occur. It is that portion of the wave energy which propagates the wave through the encircling formation in a direction parallel to the borehole (in the borehole wall) that is principally employed in accomplishing the primary objectives of the invention. As the initial wave front spreads outwardly from its source and through the borehole fluid, it moves toward the two acoustic wave receiver-transducers or detectors. Also, it meets or reaches the borehole wall, where it is refracted and enters into the encircling earth formation or rock; and a portion of the refracted wave courses longitudinally alongside the borehole. Since the acoustic wave front travels faster through the encircling rock than it does through the fluid in the borehole, a certain part of the refracted or rock-transmitted wave front outdistances the fluid-transmitted wave front. As the fluid-transmitted wave front travels along the boundary of the borehole wall, the more rapidly traveling rock-transmitted wave front is itself refracted at the borehole boundary, generating another or third wave front in the fluid, which travels inwardly toward the center of the borehole. It is this third wave front, which at a short distance up or down the borehole from the wave generator is relatively far ahead of the initial or primary fluid-transmitted wave front, that is first detected by the nearest (first) and most distant (second) acoustic wave detectors. As is hereinafter more fully explained, the time interval elapsing between detection of the most advanced wave front at the first detector and detection of the same wave front at the second detector, may be taken to be equal to the time interval required for the wave front (or any acoustic wave) to travel a distance through the encircling rock or formation equal to the distance between the wave-sensing elements of the two detectors. While this latter distance need not necessarily be any particular unit distance, it is obvious that if it is unit distance, as the latter is hereinbefore defined, then the measure of the time interval mentioned is, perforce, also a measure of the inverse of the acoustic velocity of the wave front through the encircling rock as calculated in such distance-measure units, and time. This follows from the elementary consideration that velocity equals value of distance divided by the value of the interval of time required to traverse the distance.

By causing the thus-initiated and propagated acoustic wave front to produce respective first and second electric waves as it arrives at each detector, an electrical signal or set of electrical signals, constituted by a pair of time-spaced electric waves, is produced by the detectors. By suitably selecting comparable time points, one on each of the electric waves, the time interval between the two time points is a substantially exact replica or measure of the above-mentioned time interval required for the acoustic wave to travel unit distance through the borehole encircling rock adjacent and principally between the levels of the two detectors. These time points may be sharply demarked by short-duration electric pulses, and these time-spaced pulses may readily be transmitted as an electric signal or set of electric signals to an operating location outside the borehole via one or more conductors of the suspending cable without the serious distortion effects suffered when the originating electric waves are transmitted. At the operating location the time-spaced pulses may be utilized by suitable electrical and recorder means to furnish or produce electrical and/or graphical indications of the measure of the wave velocity corresponding to each station, and/or an indication of the wave travel time interval itself. Further, by triggering or initiating action of the acoustic wave generator once each time an additional unit of distance along the borehole has been traversed by the suspended apparatus, a plurality, or series, of pairs of electrical pulses will be produced by the detectors and transmitted to the operating location outside the borehole; and by integrating the time intervals demarked by the respective pairs of such pulses, the total travel time required for an acoustic wave to travel through the encircling rock a distance equal to the extent of borehole traversed may be obtained. An electrical integration of the measures of the time intervals may readily and accurately be accomplished by conventional electric apparatus, and furnishes a measure of the total wave travel time through the extent of formations traversed; and the individual measures of the time intervals permit formation of an accurate indication of wave velocity at each station of the traverse. A suitable mode of producing an accurate measure of the value of each time interval separating first and second pulses of a signal, and an accurate and continuing integration of the value of the series of such intervals, will now be explained.

The first pulse of each signal or pair of electrical pulses from the borehole apparatus may be caused to open an electrical "gate" for admission to a translating or pulse-counting circuit of a train of accurately time-spaced electric time-count pulses which are continuously generated at a high repetition rate and which are preferably of substantially constant magnitude; and the second of the pair of electrical pulses may be caused to close the gate or terminate further admittance of the rapidly-recurring time-count pulses. Thus each pair of signal pulses causes admittance of a train or "burst" of time-count pulses to the translating or pulse-counting circuit. The time-count pulses may be generated by a suitable oscillator and wave-shaping means well known in the electronic arts, and supplied to the electrical gate means continuously; and the passed train or "burst" of these time-count pulses applied or transferred to suitable pulse-counting or integrating means for adding. The pulse-counting means may include two pulse counters of different capacities, to each of which is supplied the successive bursts or short trains of time-count pulses passed by the pulse gate means. The first of the two counters, comprising, for example, four decade units, may be employed to integrate in binary or digital form the pulses of only each individual burst or train to provide an output capable of conversion, by a binary-to-analogue or digital-to-analogue converter unit or translation matrix, into an alalogue quantity adapted for application to an inverse-function circuit network which in turn acts to provide a potential representing directly the wave velocity for the particular traverse station or level at which the pair of transmitted pulses was created. The thus provided potential is used in a recorder to produce a record of the indicated acoustic wave velocity. This will be hereinafter explained in more detail. The second of the two pulse counters, of construction and nature similar to that just described but comprising additional counter units to provide greater capacity, may be employed to add all of the pulses of each burst or train of time-count pulses passed by the gate circuit to the total of the pulses of the trains previously passed; that is, to provide an output representing the accumulated total of time-count pulses in all previous trains or bursts. This output, which may likewise be registered in binary or digital form, may be applied to a suitable electrical translation-matrix for conversion to analogue form to provide an electrical quantity or potential accurately representing by its magnitude the total number of time-counting pulses in all previously-passed bursts and hence accurately representing the total of all of the aforementioned time-interval measures and hence the total travel time of a hypothetical single acoustic wave through the rock along the logged extent of borehole. The output potentials of the two binary-to-analogue converter or matrix means may in each instance be employed to energize an appropriate deflection element of respective recorder or galvanometer means to provide "running" or current indications or logs of "total time" of acoustic wave travel through the traversed extent of rock, and "incremental velocity" or acoustic wave velocity measures at each of the logging levels or stations; it being understood that the recording means would have its record medium moved in correlation with and in proportion to traverse of the acoustic apparatus along the borehole.

In addition to providing indications and/or recordings of the hereinbefore-noted measures and integrations, the invention comprehends means for furnishing, as accurately as may be practicable, a graphical record of the output of one or both of the detectors resulting from not alone the reception of the leading wave front employed for the travel time and velocity measures, but the reception thereafter of all the wave complex transmitted by the wave generator, and reflections and refractions thereof, as received at the detector or detectors. This log is desired for comparison and correlation studies and for other purposes by those who produce and use the "acoustic velocity" and acoustic wave travel time logs.

Figure 1:
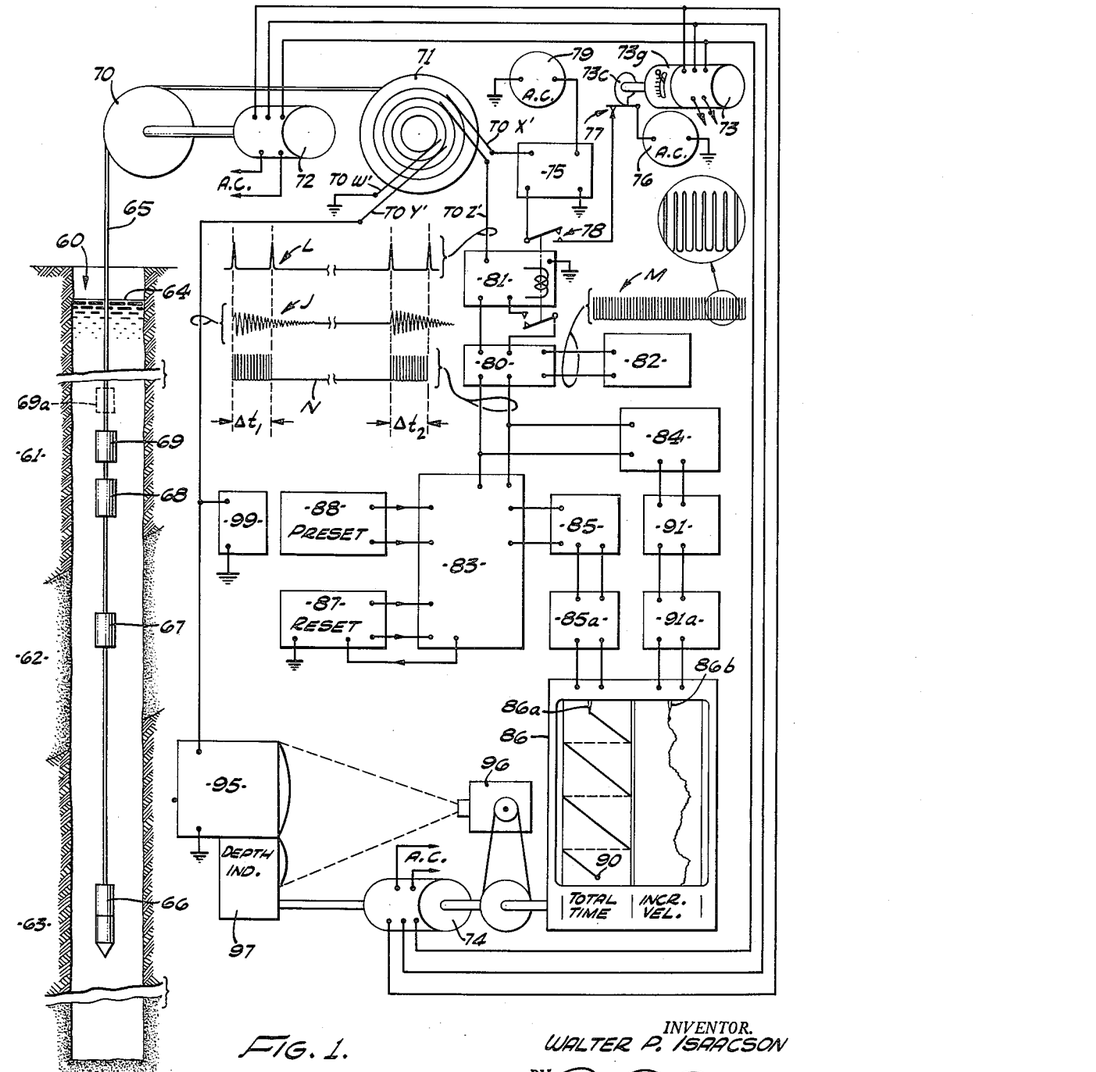
FIGURE 1 is a schematic diagram of a preferred arrangement of apparatus according to the system of the invention, partly in block diagram form and including graphical representations of certain electric potentials at particular points in electric circuits.

Referring now to the drawings, a preferred exemplary form of apparatus and the mode of the invention will be explained more in detail. The apparatus, being capable of manufacture in a variety of physical forms, is depicted for the most part by diagram, it being understood that components may be chosen from the many commercially available types and forms, in accordance with principles of good mechanical and electrical design. In FIGURE 1 there is illustrated in vertical section an extent of a typical earth borehole 60 such as is drilled in search for petroleum or other minerals. The borehole is understood to penetrate and be thereby encircled by one or more earth formations or strata, of which portions of three are indicated, at 61, 62 and 63. The borehole extends downwardly from the surface of the earth, and may be substantially filled with water or other fluid such as drilling mud indicated at 64.

Suspended for traverse through an extent of borehole 60, by suitable means preferably in the form of an end portion of an armored plural-conductor electric cable 65, is borehole apparatus including an electrically operated acoustic wave generating device 66, first and second acoustic wave receiving and translating (transducer) devices 67 and 68, respectively, an electric wave translating device 69, and an optional auxiliary amplifier indicated in dotted outline at 69a, all interconnected by means hereinafter more fully described. The apparatus suspended from and supported by cable 65 is for convenience collectively termed subsurface or borehole apparatus; and for a like reason device or unit 66 is hereinafter referred to as a wave generator, and devices or units 67 and 68 are generally referred to as receivers. It will be understood, however, that the devices or units may include other apparatus, as will hereinafter be made evident. The spacing of the several units of borehole apparatus may be varied within wide limits, but is preferably as hereinafter more particularly indicated and such as to minimize effects of borehole diameter variations on acoustic wave transmissions. The system of the invention is adapted to produce three types of "logs," and the relative spacing of the acoustic units or devices may be determined to some extent in certain types of work by the relative importance of the three types of logs. For example, if an acoustic wave-velocity log is of primary importance the acoustic wave receivers may be spaced apart a relatively small distance, for example, one foot; while if a very accurate total acoustic wave travel time log is most important, the inter-receiver spacing or distance may be many times greater, for example, ten feet. A receiver-to-receiver unit spacing of five feet may, for example, be used where all types of logs are desired at one traverse along the borehole. In all cases the first acoustic wave receiver (that nearest the wave generator) should be spaced a distance from the generator sufficient to provide good acoustic wave attenuation in the means suspending the generator from the receiver, and in accord with principles more fully disclosed later in this specification.

It will be understood that it is desirable to eliminate or reduce as much as possible, propagation or transmission of acoustic waves between the three acoustic units through the necessary physical means interconnecting devices 66, 67, 68 and 69. This may be accomplished, for example, by suspending the wave-generating means (unit 66) from the first detector means (unit 67) by a length of chain or of pre-stretched rubber-bonded rope of twisted or braided construction and enclosing or otherwise containing the necessary electrical conductor means; and by employing a similar link or connector between the two acoustic wave receivers. According to general principles hereinafter made clear, a relatively long distance may separate the wave-generating means from the first and second wave detector means. Also, as previously indicated, any suitable acoustic wave-damping means may be applied to the top and bottom portions of wave generator 66, to cause a major part of its propagated acoustic wave energy to be directed radially outwardly toward the wall of the borehole.

Cable 65 courses over a sheave or guide pulley 70 as it is paid into or withdrawn from the borehole, and is adapted to be wound upon a power-driven drum or cable reel 71 of a type well known in the art. Drum 71 is provided with conventional electrical connections such as slip-ring and brush means, whereby continuous electrical connections with the cable conductors may be maintained in a well known manner. Sheave 70 is also employed to operate means for synchronizing movement of other moving parts of apparatus at the operating location outside the borehole, with movement of the cable into and out of the borehole. Such synchronizing or correlating means may be of any suitable type but as illustrated in the exemplary form of apparatus, comprises a synchro generator 72 mechanically connected to be driven by sheave 70 and electrically connected to control rotation of synchro motors 73 and 74 which are in turn mechanically connected to respective drive mechanisms of apparatus components including recorder means. Suitable A.C. energizing power may be supplied from a common A.C. source to the several synchro units, in accord with well known practice and as indicated in FIGURE 1. The ratio of the rate of movement of the record medium of the recorder means to the rate of movement of cable 65 over sheave 70 is governed by self-contained gearing in the recorder means and may be such as will result in graphical records of desired scale. Sheave 70 is coupled through the synchro means 72—73 to drive a means for causing operation of the acoustic wave generator device once for each unit length of cable coursed over the sheave. This operation-controlling means may be of any suitable type but as shown in the exemplary embodiment of apparatus, comprises a one-cycle programmer device 75 which is supplied driving power from a source 76 through a cam-operated switch 77 and a relay-operated switch 78 as indicated. Switch 77 is closed, and opened, once for each unit length of cable coursed over sheave 70, by a cam 73c on the output shaft of gear box 73g secured to and driven by synchro motor 73. Switch 78 is normally intermittently closed by means hereinafter more fully described, but only if the preceding cycle of signaling operations has been completed in a prescribed fashion. When switch 78 is thus closed, closure of switch 77 by cam 73c results in energizing the driving motor of the self-cycling programmer device 75 from A.C. source 76. The programmer, which may be of any suitable type, as, for example, that commercially available from Industrial Timer Corp., Newark 4, N.J., is constructed and arranged to close a circuit energizing acoustic wave generator device 66 from an A.C. source 79 by way of the cable 65 and a brush and slip ring structure on cable drum 71, as indicated in FIGURE 1. The energization continues for a definite interval during the cycle of operation of the programmer, and is then interrupted, after which the programmer completes its cycle of operations and automatically stops. The cessation of energization of acoustic wave-generating device 66 causes the latter to initiate or product an acoustic wave front which contains the energy for operating the transducers in detectors 67 and 68. The transducers may be of the piezoelectric type for translating acoustic wave energy into electric waves. The manner in which the acoustic wave is produced is hereinafter more fully explained.

With the apparatus hereinbefore described, a series of individual acoustic waves, one for each successive unit length section or unit distance of traverse along the borehole, is propagated by device 66. Ordinarily, as may always be the case with that device, the individual or first wave propagated by the wave generator is followed by other waves of relatively constant frequency, the mentioned individual wave being the first wave in a wave train. In its principal aspects, however, the present invention is mainly concerned with the wave front of the first wave of each such train of waves, and certain refractions of that leading wave front.

Figure 2:
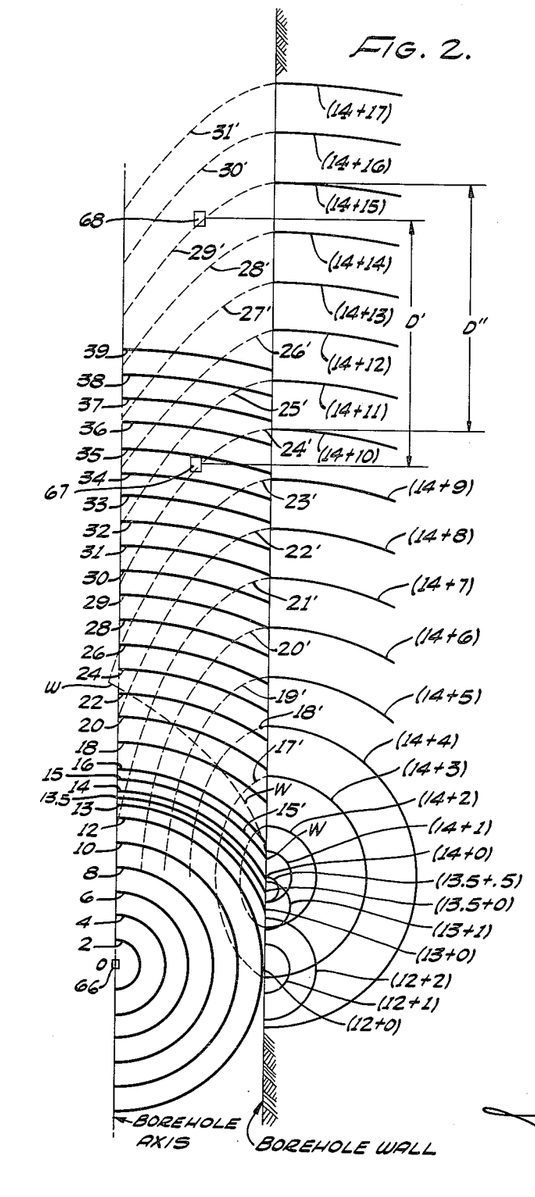
FIGURE 2 is a diagram of wave propagation as envisioned by the invention.

While not essential to a full disclosure of the method and apparatus of the invention, a possible explanation of the action of the first wave front propagated by the wave generator will be set forth to illustrate the general principles upon which operation of the acoustic apparatus of the invention rests. In this theoretical possible explanation it will be assumed that the acoustic wave is propagated from a point source, preferably on the axis of the borehole, and for the sake of simplicity it will be assumed that the rock formation and borehole liquid are such that the acoustic wave velocity through the rock is twice that through the liquid. Referring to FIGURE 2, the first or primary wave front is assumed to be propagated from a point of origin at the generator 66 at a time designated by 0. Positions of the leading wave front at intervals thereafter as it spreads through the borehole liquid are marked by arcs or lines designated by numerals such as 2, 4, 6, 8, etc. which indicate the time of arrival of the leading wave front in the borehole liquid at the particular line in arbitrary time units, which for convenience only will herein be termed milliseconds (ms.). When this primary leading wave front meets the borehole wall it is refracted and reflected, part of its energy being expended in propagating one or more refracted wave fronts as its lines or circles of contact with the borehole wall move longitudinally therealong, upwardly and downwardly from the initial line of contact. Only those effects produced in a direction toward the acoustic wave detectors, namely, upwardly, will be considered. The wave fronts propagated by refraction outwardly through the borehole-encircling rock as the primary or liquid-transmitted wave front collides with successive points along the borehole wall are designated in FIGURE 2 by additive sums in parentheses, the first number in the parenthetical expression designating the time required for the primary wave front to travel from origin at 66 to the point of origin of the secondary or refracted wave on the borehole wall; the second number in the parenthetical expression designating the time of propagation through the rock. Thus in the assumed example, the primary wave front is at arc or line 13 exactly 13 ms. after originating at 66. At that instant a refracted wave front is originated at (13+0) and propagates or spreads through the rock to the position indicated by line (13+1) after one ms. of time, the parenthetical expressions indicating that this secondary or rock-transmitted wave front was created by collision of the primary wave front with the borehole wall at a time 13 ms. following emanation from origin at 66. It will be noted that the secondary wave fronts created at the borehole wall travel twice as far per unit of time as does the primary wave front through the borehole fluid, due to the aforementioned difference in acoustic wave velocities in fluid and in rock.

It may be noted that the primary acoustic wave propagated from time 0 requires a period of time to reach the borehole wall, in this example, 12 ms.; and that thereafter it collides with successive points along the borehole at an always decreasing rate of travel along the borehole wall. For example, between times 12 ms. and 13 ms., calculated from instant of propagation, the point of collision moves from point (12+0) to point (13+0) on the borehole wall, while during the next one ms. period it progresses a much smaller distance, from (13+0) to (14+0) along the wall. Thus it is seen that at first the rate of progress of the primary wave front along the borehole wall is faster than the rate of progress of the rock-transmitted secondary waves through the rock in the same direction. For example, at time 13 ms., the primary wave has reached (13+0) on the borehole wall, but the position of the secondary wave originated at (12+0) has, one ms. later, reached only arc (12+1) which intersects the borehole wall below point (13+0) although the total elapsed time from 0 is the same. However, due to the decreasing rate at which the collision front of the primary wave front progresses along the borehole wall, a point is reached (in this example, at approximately 14 ms. after origin) at which the secondary wave propagated in the rock moves upwardly through the rock along the borehole boundary faster than the line of collision of the primary wave with the borehole wall. For example, it may be noted that at (14+4) the secondary wave front propagated from (14+0) has progressed through the rock to a point well in advance of the primary wave front, which at the same moment has reached the location indicated by arc 18. The secondary or refracted wave front that is propagated at that point along the borehole wall where the rate of wave transmission through the rock is at that moment equal to the momentary rate of progress of the primary wave front along the borehole wall is thus the wave front that leads all others in traveling upwardly through the borehole encircling rock; and it is this leading rock-transmitted wave front that is of primary interest in operations according to the present invention. Hereinafter it will be termed the leading secondary wave front, meaning the refracted or rock-transmitted wave front which leads all others caused to be propagated in the borehole-encircling rock by the wave front of the first primary acoustic wave propagated at origin 0.

As the leading secondary wave front travels upwardly through the rock it has a progressing line of contact or collision with the borehole wall, and along this line of contact is refracted, giving up part of its energy in creating another wave front in the liquid in the borehole. The positions of this last-mentioned wave front, which hereinafter is termed a tertiary wave front as a matter of convenience, are designated by primed numerals such as 17', 18', 19', etc., the numerical portion of the designation representing the time elapsed between propagation of the original primary wave front at time 0 and arrival of the tertiary wave front at the dotted-line curve designated by the particular primed number. Since this tertiary wave front, in the illustrative example, travels inwardly toward the axis of the borehole only half as fast as its point of origin progresses upwardly along the borehole boundary, successive lines of position of the wave front may be taken to lie along the curved dotted lines 17', 18', 19', etc. It is this "tertiary" wave front (which of course is followed by diverse sorts of reflection and refracted wave fronts), that is utilized by the acoustic wave detectors 67, 68 and electric wave translating device 69 to produce an electrical signal or set of signals in the form of a pair of time-spaced electrical pulses whose time-separation is employed as a measure of the time required for the leading secondary wave front to travel unit distance through the borehole-encircling rock next adjacent the detectors.

It may be noted that as the aforementioned leading tertiary wave front progresses through the borehole fluid it interferes with the original primary wave front, the imaginary surface along which this interference occurs being indicated by the dotted line W—W. It is evident that, theoretically at least, the detectors should be located above this imaginary surface in order that they be reached first by the undisturbed leading tertiary wave front so as to produce clear, unambiguous responses indicative of arrival of only that leading wave front.

Some distance above the surface indicated by line W—W, and depending somewhat upon the distance of the responsive surface of the acoustic wave detectors from the borehole wall, it is seen that the distance between the two detectors, namely, D', is substantially (though not quite exactly) equal to the distance D" through the rock covered by the leading secondary wave front during the interval of advance of the tertiary wave front from the first detector to the second detector. While these distances are not quite exactly the same, the difference therebetween may be made so small by properly positioning the detectors with respect to the wave generator at 66 and with respect to the borehole wall, and by adjusting the "effective" or actual spacing of the detectors, that the error is as small as desired or as is required for attaining the desired degree of accuracy of the measures.

Thus, for practical purposes, D" is taken to be equal to D'; and since the latter may be chosen so that D" is precisely unit distance, the time between secondary wave front arrivals at (14+10) and (14+15), that is, the time required to travel distance D" through the rock, is equal to the reciprocal of the acoustic wave velocity through the rock from (14+10) to (14+15); and the time separation of corresponding points on the leading edges of the two electrical waves created by the respective detectors is similarly equal to the same quantity. Means are provided in device 69 for extracting from the electrical waves produced by detectors 67 and 68, corresponding first and second electrical pulses whose time separation or time spacing interval accurately represents and is equal to the time lapse between arrivals of the tertiary wave front at the two detectors.

Figure 3A:
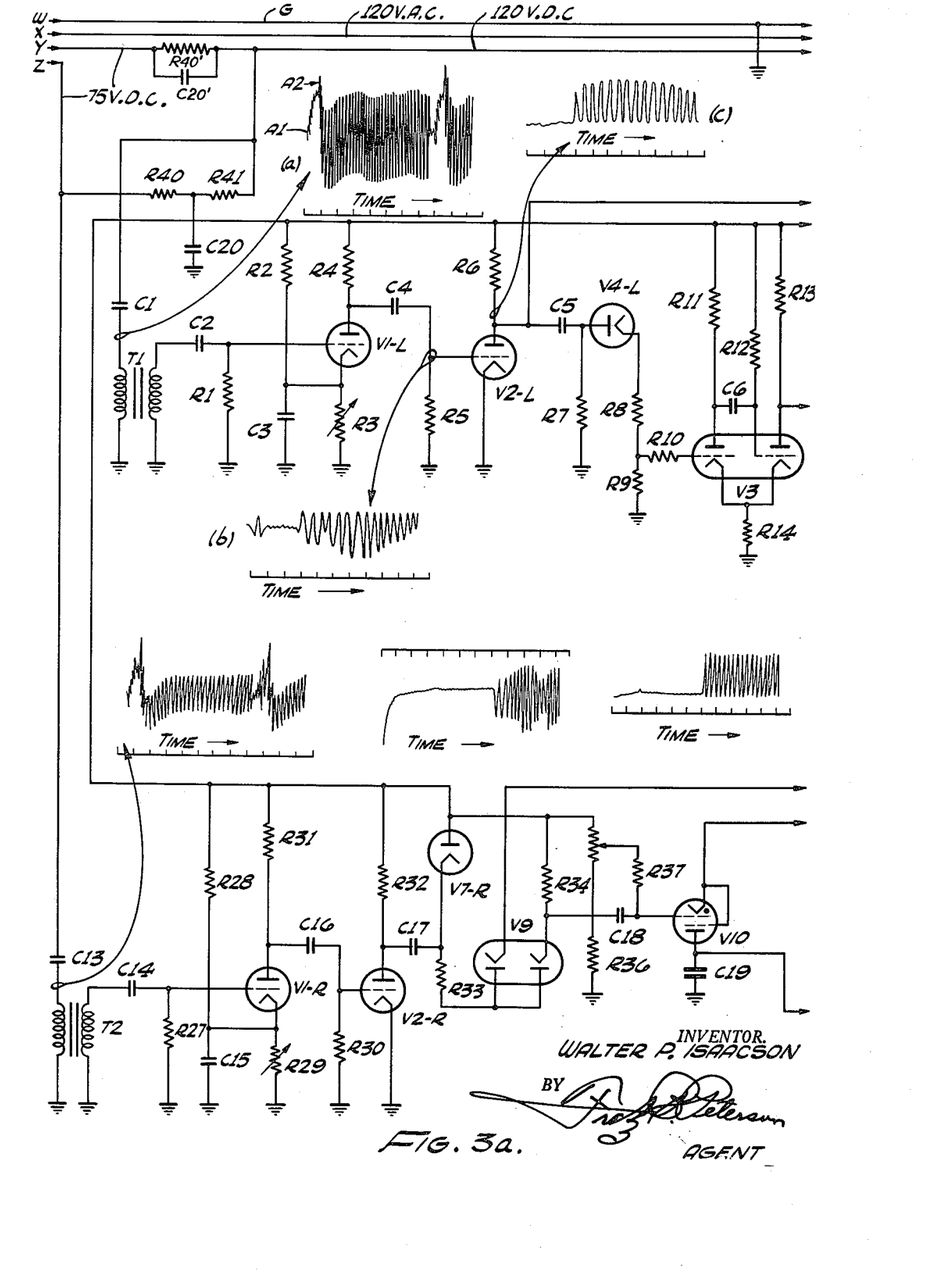
FIGURES 3a and 3b are components of an illustrated circuit diagram of one portion of apparatus diagrammatically illustrated in FIGURE 1.
Figure 3B:
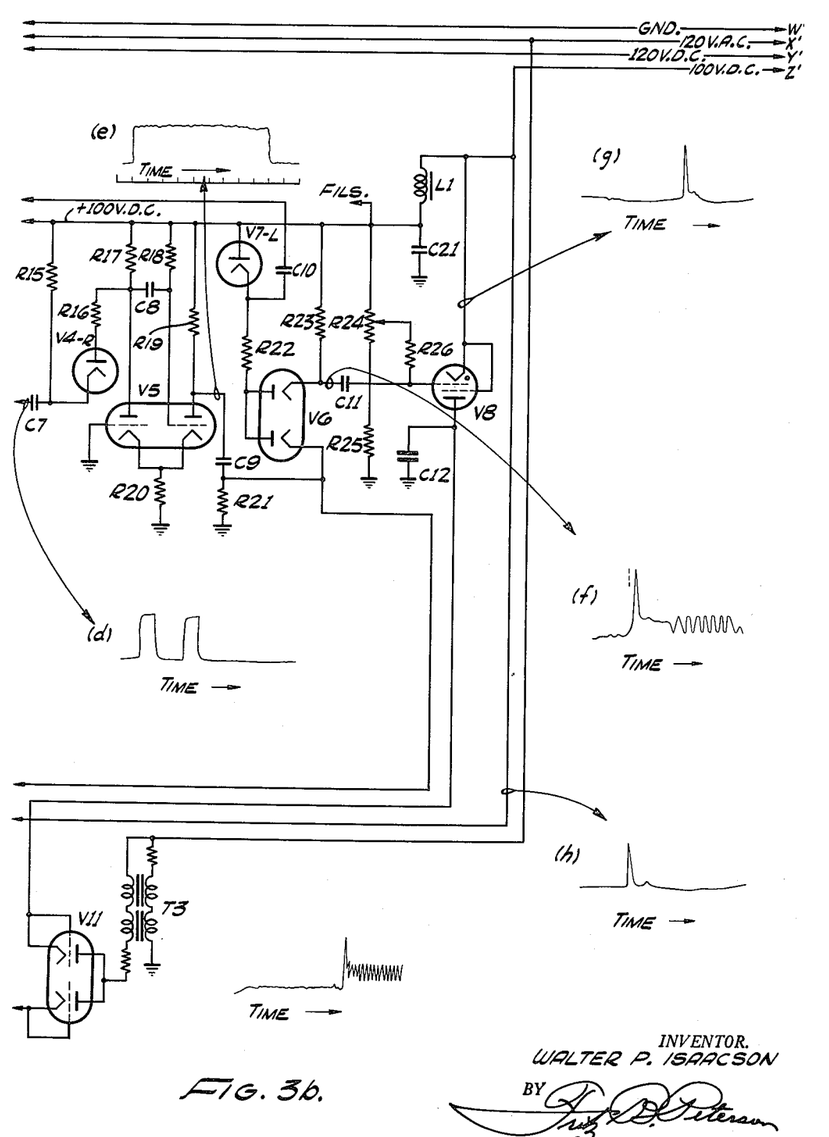

Referring now to FIGURES 3a and 3b, there is illustrated by diagram a preferred form of apparatus included in wave translating device 69. This apparatus comprises electronic means for receiving from the conductors leading to and from receiver devices 67 and 68, the electric waves from which must be derived or produced a pair of time spaced, preferably high-amplitude, short-duration electric pulses whose time separation represents the acoustic wave front travel time through one unit length section of rock along the borehole wall. FIGURES 3a forms the left-hand portion of the diagram and FIGURES 3b the right-hand portion, the breaks in the several interconnecting conductors between the two figures being terminated in arrow points. Conductors W, X, Y and Z at the upper left of FIGURE 3a represents the conductors extending between device 69 and the receivers 67 and 68 therebelow; and conductors W', X', Y' and Z' at the upper right of FIGURE 3b represent the conductors of the cable 65 interconnecting unit 69 and the slip rings of drum 71; (with optional inclusion of preamplifier unit 69a which may be used to amplify the entire wave output of one of the transducers, representing the entire acoustic wave complex). Conductor W—W' may be the armor or sheathing of cable 65 and is utilized as the "ground" of the interconnected electrical units of the apparatus.

Referring again to FIGURES 3a and 3b, the signal from acoustic wave receiver 67 is incoming on conductor Y at the upper left of FIGURE 3a. This signal is translated to the primary of transformer T1 through capacitor C1; and from the secondary of T1 the signal is developed across resistor R1 through C2 and transferred to the grid of the left triode section V1–L of an amplifier tube V1. R1 and C2 form a high pass filter which effectively separates the low frequency transients and 60-cylcle voltage from the incoming signal. The wave form (a) diagrammatically illustrated above V1–L and R4 is illustrative of the incoming wave form applied to the primary of transformer T1. It will be noted that the principal portion of the graph illustrates a slightly fluctuating but fairly steady alternating current wave of 60-cycle frequency. The 60-cycle wave is suddenly switched off by the programming means, and a transient wave, indicated at A1, ensues, followed by a sharply rising wave A2 in which is contained the output of the acoustic wave receiver unit 67 and from which is to be derived the first pulse of a signal pulse pair. The wave form is plotted to a scale indicated of 250 ms. per division.

Resistors R2 and R3 comprise a voltage divider by which the potential on the cathode of V1, and therefore the bias, may be set. The purpose of this adjustment is to provide a noise discrimination circuit which will amplify signal plus noise and not noise alone. The amplified signal is then developed across plate load resistor R4 and translated through C4 to R5 and applied to the grid of the first triode section V2–L of a tube V2. V2–L is preferably operated at zero bias so that a maximum positive swing of the plate potential is available. The arrangement of the apparatus is such that the polarity of the first half cycle of the received signal wave will appear negative at the control grid of V2–L. Wave form (b) shown immediately below R3 is illustrative of the input signal applied to the control grid of the first triode section V2–L of V2; and wave form (c) is illustrative of the output signal at the plate or anode of V2–L. These wave forms are plotted on a scale of approximately 50 microseconds per division. The latter output signal serves two functions, namely: first, it is fed through C5 and the first half V4–L of tube V4 to the control grid of the first triode section of V3. V3 is a mono-stable cathode-coupled multivibrator whose function is to trigger an acceptance gate multivibrator comprising tube V5, after a predetermined time delay. The purpose of this delay is to exclude from the signal the transient created by the firing of the acoustic transmitter, this transient existing on the same cable conductor. In actual practice this transient terminates prior to a lapse of 100 microseconds following the time the transmitter or acoustic generator fires; and since the received signal never arrives prior to 100 microseconds following firing of the transmitter, a delay of 100 microseconds in V3 and hence in the acceptance gate, will exclude the transmitter transient but permit all of the received acoustic wave-representing signals to pass. The first half V4–L of tube V4, herein termed a disconnect diode, prevents loading between V3 and V2–L. Resistors R8 and R9 are comprised in a voltage divider which decreases the signal amplitude to a value suitable to the operation of V3. Resistor R10 serves as a grid current limiting resistor; and R11 and R13 serve as plate load resistors for V3. Resistor R14 serves as the common cathode resistor across which the positive feed-back potential is developed during the course of operation of multivibrator V3. Resistor R12 and capacitor C6 constitute a network which plays a large part in determining the time delay produced by multivibrator V3. A graph or wave form (d) situated below resistors R20 and R21 in FIGURE 3b is illustrative of the output signal wave at the anode of the right section of V3.

V5, as previously indicated, is comprised in an acceptance gate multivibrator. It is mono-stable and cathode coupled, as in the case of V3. The function of V5 is to control the acceptance gates comprising tubes V6 and V9, which will permit signals to pass only during the period the right anode of V5 is in its positive cycle. Since the received electric signals representing the leading acoustic wave front, will never arrive more than 2,500 microseconds after the transmitter fires, and since the first 100 micoseconds are already used by V3, a time delay of 2400 microseconds will be sufficient for V5. In practice, the duration of this delay is not critical as long as it equals or exceeds 2400 microseconds; and accordingly the circuit values are selected to provide a delay of approximately 3000 microseconds. Wave form (e) shown directly above R18 and C10, is illustrative of the output wave at the anode of V5, the scale value being about 350 microseconds per division.

The second function of the output signal from the plate of V2–L is to trigger thyratron V8 to produce the first electric signal pulse of a pulse pair. The signal is applied from the plate of V2–L to the control grid of V8 through capacitor C10, resistor R22, V6 and capacitor C11. V6 is the acceptance gate for the first received signal and will permit the signal to pass only during the period when V5 is not in its quiescent condition.

V6 operates as an acceptance gate in the following manner: When V5 is in its quiescent condition (non-acceptance) current flows from ground through R21, the lower half of V6, R22 and V7–L of a double diode V7 to the +100 volt conductor (Z') of the cable. The potential thus established at the anodes of V6 is approximately 80 volts. The voltage at the cathode of the upper section of V6, supplied through R23, is +100 volts. In this condition a positive signal in excess of 20 volts must be applied to the anode of the upper half of V6 in order to cause conduction between the anode and cathode of the upper half of V6. Since in practice the signal applied there does not ever reach +20 volts, the upper half of V6 is at this stage effectively blocked. At the start of the acceptance period the cathode of the lower section of V6 is driven to +140 volts, by the signal at the anode of the right triode section of V5, as translated through capacitor C9. Accordingly, conduction through the lower section of V6 then terminates, and the positive potential applied to the anodes of V6 increases immediately from 80 v. to 100 v. Under this condition no potential difference exists between the anode and the cathode of the upper section of V6, and any positive signal applied to the anode of V6 can cause this section to conduct. Accordingly, V6 may now pass the signal. The left section V7–L of V7 serves as a disconnect diode between Z' and R22. Its function is to permit the potential on the anodes of V6 to exceed +100 volts since the latter is necessary if V6 is to pass the signal. Wave form (f) to the right of the circuits in FIGURE 3b is illustrative of the wave form at the cathode of the upper section of V6.

Resistors R24 and R25 are comprised in a voltage divider which permits the bias on gas-filled thyratron type tube V8 to be adjusted. C12 performs as an energy storage capacitor which will be discharged through thyratron V8 into the cable conductor Z' when the thyratron is triggered by the first received wave front signal. Firing of the thyratron provides the first signal pulse of a signal pulse pair to be transmitted upon or over the cable to the operating location outside the borehole. The wave form (g) depicted at the upper right of FIGURE 3b illustrates the form of the output pulse applied to the cable conductor Z' by tube V8 when that tube fires. The pulse there represented is later followed by the second pulse of the pair whose spacing or time-separation is substantially equal to or otherwise mathematically related in known terms to the time interval separating arrivals of the acoustic wave front at the first and second detectors.

A second transformer T2 is coupled by way of capacitor C13 to conductor Z, as indicated in the left-hand portion of FIGURE 3a. Apparatus comprising transformer T2, the right half V1–R of V1, the right half V2–R of V2, the right half V7–R of V7, V9 and V10 and appurtenant circuitry shown with these tube elements, is adapted to function in a manner substantially identical with that hereinbefore explained in connection with transformer T1 and the circuitry which the latter feeds, except that T2 handles the signal output of the second acoustic receiver-transducer means in unit 68, and of course, the acceptance gate circuitry is not triggered by this signal channel. The second acoustic wave-representing signal, from unit 68, is received on conductor Z. Transformer T3 and tube V11 (see FIGURE 3b) are components of a power supply unit by which capacitors C12 and C19 are charged. The alternating current excitation of T3 is cut off prior to the firing of the acoustic transmitter by the programmer 75, and the power supply is thus effectively disconnected from the energy storage capacitors by V11 until the next cycle of operations is commenced. As indicated, transformer T3 is supplied from the 120-volt A.C. lead comprising cable conductor X' extending to the apparatus outside the borehole. The mode of thus charging capacitors C12 and C19 preparatory to subsurface acoustic operations is elementary and need not be further explained.

The RC filter network R40—C20—R41 isolates the signal pulses appearing on lines Y and Z from cross-feeding while permitting the direct current voltage required for operation of receiver means 67 and 68 to be provided from the same cable conductor Y'. At the same time the voltage drop through resistors R40 and 41 reduces the voltage provided to receiver means 68 from that available on conductor Y'. Similarly the voltage drop across resistor R40' reduces the voltage provided to receiver means 67. Condenser C20' is connected across resistor R40' to by-pass resistor R40' for signal pulses.

Referring again to FIGURE 1, a cycle of operations proceeds as follows: The cycle of operations is commenced by the applicaton of alternating current to the cable conductors X'—W' in response to the closure of switch 77 by the cam 73 rotated by synchro motor 73. Closure of switch 77 permits curent to flow from A.C. source 76 through switch 78 (assuming that switch has been closed manually, or automatically, upon the successful completion of a previous cycle), and through the one-cycle motor-driven programmer means comprised in unit 75. Rotation of the motor-driven means in unit 75 closes the circuit from A.C. source 79 through that unit into the cable whereby alternating current is furnished to conductors X' and W' comprised in cable 65. Application of the alternating current potential to the cable results in the charging of the energy-storage capacitors C12 and C19, and in charging of the energy-storage capacitor in the transmitter in acoustic wave generator unit 66. At a time prior to completion of its cycle of operations, the motor-driven means in unit 75 disrupts the supply of alternating current from source 79 to the cable. This produces three effects: first, disconnection of all of the power supplies from their respective charge condensers; second, the initiation of a time delay in unit 66 at the termination of which the acoustic wave transmitter therein is fired and an acoustic wave thereby propagated at unit 66; and third, the elimination of "cross-talk" from the alternating current lead X' into the signal lead Z'.

When the transmitter in unit 66 fires, an acoustic pulse or wave is propagated for subsequent initiation of a wave front for reception by each of the acoustic receivers in units 67 and 68; and there are also generated in the receiver signal conductors a signal employed to trigger the surface equipment, and an unwanted transient. The unwanted transient enters both channels of the wave translating means in unit 69 whose circuitry is depicted in FIGURES 3a and 3b, but the transient does not reach either of the output thyratron tubes (V8 and V10) for the reason that the previously-described acceptance gate is still closed. The 100-microsecond delay multivibrator comprising V3 is triggered at a time here for convenience designated as $T-O$, as a result of the arrival of the transmitter transient. At a time 100 microseconds subsequent to its triggering at time $T-O$, that is, at $T-O+100$, the delay multivibrator completes its cycle of operation and triggers the acceptance gate multivibrator comprising V5. This opens the acceptance gate and any subsequently received sgnal will trigger the first channel output thyratron V8. The leading acoustic wave front arrives at the first acoustic wave receiver, in unit 67, at, for example, a time approximately 600 microseconds subsequent to time $T-O$. The acoustically-created electrical output of the receiver in unit 67 is applied through transformer T1 to the first channel of the wave-translating means comprised in unit 69, and since the acceptance gate (V5) is open, thyratron V8 fires on the first half-cycle of the received signal, discharging C12 and producing in conductor Z' of the cable the first electric signal pulse of a pulse pair (depicted as wave form $(g)$), said signal pulse comprising a sharp spike of voltage or potential whose time of occurrence is substantially coincident with the arrival of the leading acoustic wave front at the first acoustic receiver in unit 67. At a subsequent time (herein assumed to be at time $T-O$ plus about 2500 microseconds) the leading acoustic wave front arrives at the second acoustic wave receiver, in unit 68; and is translated into an electrical wave which is applied through transformer T2 to the second (lower) channel of the wave-translating means indicated in FIGURES 3a and 3b. Operation of the second channel of the wave-translating means is similar to that of the first channel operation with the exception of absence of gating means, and results in firing thyratron V10 with discharge of C19 and the application to cable conductor Z' of the second signal pulse of a signal pulse pair, which is depicted as wave form $(h)$. Thus the wave forms of the signal pulses applied to Z' are such as are indicated at $(g)$ and $(h)$. Since the occurrence of the second signal pulse is substantially coincident with the arrival of the leading acoustic wave front at the second acoustic receiver in unit 68, the time interval separating the first and second electric signal pulses applied to conductor Z' is substantially coincident with and equal to the time interval elapsing between the successive arrivals of the leading (tertiary) acoustic wave front at units 67 and 68. A short time thereafter the acceptance gate is closed by the multivibrator comprising tube V5, and the wave-translating circuits are again in condition for commencement of another cycle of operations.

The set or pair of first and second electric pulses produced in unit 69 are delivered via the slip ring and brush arrangement of drum 71 (FIGURE 1) to an electronic pulse gate circuit unit 80 by way of a signal-translating unit 81 and by means of suitable conductors as indicated, the delivered signal pulses being of the general form indicated by auxiliary graph L in FIGURE 1. Unit 81 may be of any suitable nature, or such as is disclosed in copending application Serial No. 589,298 of Isaacson and Tejada-Flores (filed June 4, 1956, and now Patent No. 2,982,943), the unit comprising means to preclude translation of signal pulses therethrough unless two properly time-spaced pulses of a signal pulse pair are received, and the means acting to cause closure of the relay including switch 78 if such properly time-spaced pulses are received. The normally closed gate circuit of unit 80 is opened by the first pulse of a pair of signal pulses passed by unit 81, and is reclosed by the second pulse of the pair. A high-frequency pulse generator means 82 is provided to furnish to input terminals of the gate circuit of unit 80 a continuous succession of very rapidly recurring electric potential pulses at a substantially constant repetition rate or frequency, these high-frequency pulses being of the nature of those depicted diagrammatically in auxiliary graph M in FIGURE 1. These pulses, being of substantially constant electrical and time characteristics, are employed as time-measuring units in measuring the time interval separating the two pulses of the pair of transmitted signal pulses. This is accomplished by passing the time-measuring pulses from generator means 82 through the gate circuit only during the interval the gate circuit is open, and in another unit counting the passed pulses, by suitable pulse counting means. In the interest of accuracy of measurement, the repetition rate of the pulses provided by generator means 82 should be as high as is practicable, and is preferably of the order of one million per second, for example, if an acoustic receiver spacing of one foot is used. The gate circuit is thus seen to pass to the pulse counting means, a "burst" or short train of the time-measuring pulses generated by unit 82 each time a pair of signal pulses is received, the number of time-measuring pulses in a given burst being directly proportional to the mentioned time interval separating the signal pulses of a pair. Bursts of the time-measuring pulses, corresponding to two pairs of received signal pulses, are depicted in graph N in FIGURE 1, the time periods $\Delta t_1$ and $\Delta t_2$ indicated corresponding to the time intervals measured.

Each burst of time-measuring pulses passed by the gate circuit is applied to either or both of a pair of pulse counting units 83 and 84. These units may be ordinary digital type pulse counters, but for the sake of simplicity of circuitry and other reasons, employment of binary counters is preferred. Further, counter 83 is preferably of greater capacity than is necessary for counter 84, as hereinbefore indicated. The latter counter is employed to count only the pulses in one individual burst of pulses and is then immediately automatically reset for counting the pulses of the next burst; while counter 83 is employed to count all of the pulses in a considerable number of bursts, for the purpose of integrating all the time-measuring pulses passed by the gate unit 80 during a long period of time, thus to provide an indication of the "total time" of travel of the acoustic waves propagated at a series of stations unit distance apart in the borehole. The output of the binary type of counter is preferably converted to an electrical analogue of the value of the count effected, by operation of a conventional conversion matrix of the type employing relays operating in accord with the pulse count, to provide a combination of electric potentials accurately representative of the pulse count. This binary-to-analogue conversion, and the less preferred digital-to-analogue conversion, are well known procedures in the electronic computer art, and the apparatus employed may be any of many suitable forms commercially available.

The output of binary counter 83 is converted into an electrical analogue potential proportional to the total count of all the time-counting pulses comprised in a plurality of bursts or trains, by means including a binary-analogue converter unit 85 in combination with the operational circuit 85a. Converter unit 85 provides a resistance whose value is varied in inverse proportion to the number of pulses counted, and this resistance and another resistance in operational circuit 85a are connected in series and have applied across them a constant potential $Vi'$ to produce in the output of 85a a potential directly proportional to the number of pulses counted and hence proportional to the total of the time intervals demarked by the respective pairs of original signal pulses transmitted from device 69. This output potential is applied as indicated to the left-hand channel of a two-channel recorder 86 for recording, where it causes a gradually increasing deflection of the recorder pen 86a associated with that channel as the borehole apparatus is traversed along the borehole. So that a convenient scale for the graphs made by the recorder may be had, the graph of "total time" as formed by pen 86a may in a relatively short traverse of borehole progress all the way across the appropriate portion of the chart or paper. In such case, for continued operation it is necessary that the pen be reset to zero deflection as soon as it has reached the position of maximum deflection. To this end, a reset circuit 87 is supplied with an output of counter 83 and operates to cause resetting of the counter to zero as soon as the counter has reached an integrated count corresponding to the maximum deflection of the pen 86a of the recorder. Resetting of the counter to zero causes recorder pen 86a to return to zero position on the chart paper, after which a new section of the graph is commenced. The results of two complete recorder pen cycles or traverses of this type, and portions of two other traverses or cycles, are illustrated in the graph formed by pen 86a in FIGURE 1. The result of this system of recording "total time" is that for long traverses along the borehole, pen 86a will produce one, two, or more, complete graph sections or lines across the "total time" portion of the chart. The time value of one complete traverse or graph section being known, it is a matter of simple arithmetical operation to determine the "total time" corresponding to the entire extent of borehole traversed. In the event the logging is not commenced or terminated at one or the other of the borehole extremities, it is desirable to have the "total time" graph commence at a value on the chart corresponding to a time value representing the acoustic wave travel time from the respective terminus of the borehole to the location where logging is commenced. To accomplish this, binary counter 83 is also provided with a presetting device 88 whereby its initial count may be manually set to the desired starting value. The pen 86a of the recorder will then automatically commence the total time graph at the proper value, as indicated, for example, at 90 on the chart in FIGURE 1.

Counter 84 is automatically reset to zero value prior to commencement of the count of pulses of any given pulse train. Its output is applied to a second binary-analogue converter means comprising a converter 91 and a function or operational circuit 91a. The combination of units 91 and 91a provides two series-connected resistances, one of which has its value changed in accordance with the pulse count, and there is applied across the resistances a constant potential Vi. The values of the resistances are such that an output potential from 91a is produced which is proportional to the reciprocal of the pulse count effected by the counter 84, in a manner hereinafter explained in connection with FIGURES 4 and 5. This output potential is applied to the driving unit for pen 86b of the second channel of the recorder 86, to displace that pen to a position transversely of the chart corresponding to the value of the applied potential and hence corresponding to the velocity of an acoustic wave at the location being logged. This position of the pen is maintained until a different potential is applied to the driving unit which traverses pen 86b across the chart or paper, so the graph produced by pen 86b is indicative of the acoustic wave velocity at any selected point along the investigated extent of the borehole.

Figure 4:
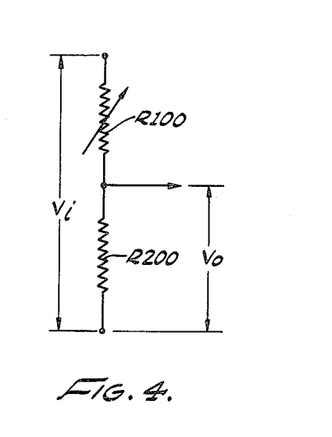
FIGURE 4 is an electrical network diagram of means included in apparatus depicted in block diagram form in FIGURE 1.
Figure 5:
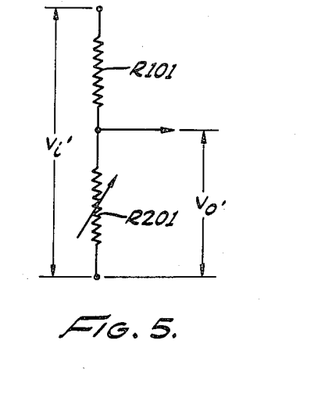
FIGURE 5 is a diagram similar to FIGURE 4, of another electrical network means.

The basic operations performed by the combinations of units 85 and 85a in one case and 91 and 91a in the other case, may be illustrated by explaining the operations of the illustrative elementary circuits depicted in FIGURES 4 and 5; it being understood that these circuits and operations are only illustrative and may be widely varied within the scope of the invention.

Considering first the circuit of FIGURE 4, a constant input potential Vi is applied as indicated, and an output potential Vo may be taken as indicated from across resistance R200 which is of fixed value. R100 is, as indicated, a variable resistance. It is evident that the output voltage Vo is given by the relation:

$$Vo = \frac{Vi(R200)}{R100 + R200}$$

and if R200 is very much smaller than the minimum value of R100 then, for practical purposes, $$Vo = \frac{Vi(R200)}{R100}$$

and since V$i$ and R200 are both constant in value, $$V_o = \frac{K}{R100}$$

wherein K is a constant.

Now, if R100 is made proportional to the number of pulses in one of the aforementioned trains or bursts of pulses, that is, is made proportional to the time interval $t$ represented by the burst and demarked by a pair of the received signal pulses (and thus proportional to the acoustic wave travel time for unit distance at the particular logging station or level), then:

$$V_o = \frac{K2}{\Delta t}$$

wherein K2 is a constant depending upon the value of K and the proportionality factor interrelating R100 and $\Delta t$. Thus it is seen that the output potential V$o$ is inversely proportional to the pulse count and to the time interval between the two received signal pulses that may be applied to the gate circuit; it being assumed that the combination of units 91 and 91$a$ provides the network R100–R200 as described. Accordingly, the output V$o$ may be taken to be directly representative of the acoustic wave velocity at the logging station or level furnishing the signal pulses.

The inverse relationship between input and output potential may also be secured by the circuit arrangement of FIGURE 5 wherein R101 is constant and R201 is kept proportional to the reciprocal of the pulse count furnished by the pulse counting unit 84. In this circuit:

$$V_{o'} = \frac{Vi'(R201)}{R101 + R201}$$

and if R101 is made very much larger than the maximum value of R201, then, for practical purposes $$V_{o'} = \frac{Vi'(R201)}{R101}$$

Since V$i'$ and R101 are constant: $V_{o'} = K'(R102)$ where K$'$ is a constant. And since R201 is proportional to 1/$\Delta t'$, $$V_{o'} = \frac{K'2}{\Delta t'}$$

where K$'$2 is a constant similar to K2 hereinabove. Thus the inverse relationship of input and output potential is secured.

If desired, the circuits depicted in FIGURES 4 and 5 may be employed in the combination of units 85—85$a$ to provide an output potential directly proportional to the pulse count, by varying R100 in inverse proportion to the pulse count in the case of FIGURE 4, and by varying R201 in direct proportion to the pulse count in the case of FIGURE 5. Thus either of the circuits may be employed in either of the combinations, depending upon the nature of the variation of the variable resistance.

The chart paper of recorder 86 is driven through internal gearing at a rate directly proportional to rate of movement of cable 65 into or out of the borehole, by means of the aforementioned synchro motor means 74. Thus graphs or logs, correlated with borehole depths at the measuring stations, are produced showing incremental velocity measures at the individual logging station and also showing total acoustic wave travel time alongside the logged extent of borehole. It is desirable in some instances to provide, in addition, a log or running record of the electrical wave forms representing the successive acoustic wave form complexes received at one of the acoustic receivers. This is supplied by feeding the output of one of the acoustic receivers directly into a conductor of the suspending cable, to provide an output including a complete electrical potential representation of all of the acoustic wave complex arriving at the receiver. The electric analogue of the acoustic wave complex thus transmitted via a conductor of the cable is applied to a separate recording means. The complex electric potential representing the acoustic wave complex, and of the general form indicated diagrammatically by auxiliary graph J in FIGURE 1, is applied by way of the slip ring and brush structure of drum 71 and suitable conductor means, to a synchroscope 95, where it is displayed on a tube face of suitable persistence and with a selected sweep rate. The synchroscope portrayal of the wave form of the applied potential may be recorded on film by a camera 96 of the motion picture type which is stepped or driven by internal gearing driven as indicated in FIGURE 1 from the aforementioned synchro motor means 74. To provide ready correlation of the several film-recorded images of the wave shapes with borehole location at which the particular wave shape was derived, there may be included in the field or view of camera 96 the face of an odometer or "depth" indicator 97 which is connected as indicated to be driven by synchro motor means 74 concurrently with movement of cable 65. Thus each exposure on the film of camera 96 may include a photographic record of the depth or location in the borehole at which the wave shape recorded was derived.

Direct current is supplied to conductor Z$'$ of the suspender cable by way of the brush and slip ring means from a power supply contained in unit 81. Direct current is supplied to conductor Y$'$ of the cable by way of the brush and slip ring means on drum 71, from a power supply indicated at 99 which is connected to the lead extending to synchroscope 95. The direct current connections from the respective power supplies are effectively blocked against entry of the received A.C. signals appearing on the cable conductors, by well known means, and similarly, unwanted direct current is prevented from affecting the operation of the synchroscope.

From the preceding description it is seen that the borehole apparatus, as it is traversed along or through an extent of borehole, is caused to initiate at each of successive stations an acoustic wave which progresses or propagates through a length or section of the borehole wall, each of the successive contiguous sections being of a length (measured longitudinally of the borehole) equal to the distance between successive acoustic wave-generating stations. The acoustic wave requires a period of time to traverse the section, and this period of time is demarked by first and second electric pulses which are employed at the surface location in forming a registration, preferably in the form of a graphical representation, of progressively integrated values of acoustic wave travel times. Additionally, a similar registration is effected of the acoustic wave velocity for each such unit-length section of the borehole as the traverse is performed, to provide a true acoustic wave velocity log of the traversed formations, as distinguished from the known acoustic wave travel time logs. The registrations or logs are provided, in the exemplary apparatus, with indications of borehole depth. The apparatus also provides a photographic representation of acoustic wave forms correlated with depth in the borehole. It is evident to those skilled in the art that the details of the structure of the apparatus may be widely varied within the scope of the invention, and accordingly, it is desired to be not limited to the details of the exemplary type of apparatus and operation described, but what is claimed is:

1. An earth borehole logging system comprising, in combination: an electric conductor cable; means connected to said cable for traversing at least one end portion of said cable through an extent of an earth borehole; an acoustic wave transmitter connected to said end portion for traverse therewith through an equivalent extent of borehole; first and second acoustic wave receiver-transducers connected to said end portion of said cable for traverse therewith, and each spaced a substantially constant distance from one side of said transmitter and spaced a constant unit distance each from the other, during such traverse; means connected to said transmitter for causing said transmitter to initiate during such traverse an acoustic wave at each of a series of borehole stations separated such constant unit distance apart; means electrically connected with said acoustic wave receiver-transducers to receive the outputs thereof and to produce in response thereto and corresponding to each such borehole station, first and second electrical pulses whose time-separation is substantially equal to the interval elapsing between arrival of an acoustic wave, initiated by said transmitter, at said first and second receiver-transducers, respectively, whereby to provide a measure of acoustic wave travel time for each such unit distance of borehole-encircling earth formation traversed; and means responsive to said means providing a measure of acoustic wave travel time for adding each such measure to all previously provided measures, and recording the results of successive additions, to provide a log of total time of acoustic wave travel for said extent of earth borehole.

2. In a borehole logging system, apparatus comprising: means comprising an electric conductor cable having a portion adapted for traverse through an extent of an earth borehole; electro-acoustic devices connected to said cable for traverse therewith, and adapted upon each energization thereof to initiate an acoustic wave and provide on conductor means of said cable, first and second time-separated electric pulses whose time-separation represents the time required for such acoustic wave to travel a predetermined unit distance through the borehole encircling earth formation as measured longitudinally along the borehole wall; means connected to said cable including means connected to said cable to traverse said portion of said cable and said devices through an extent of such borehole and means connected to said cable to repetitively energize said electro-acoustic devices at the commencement of traverse by said devices of each of successive contiguous sections of such borehole of length equal to said predetermined unit distance; and means connected to said conductor means to receive and translate into a determined time measure each set of first and second electrical pulses provided on the conductor means of the cable, and add each such determined time measure to all previously determined time measures, to provide a total of time measures corresponding to the time required for an acoustic wave to travel through the earth formation alongside the traversed sections of borehole.

3. In an acoustic earth borehole logging system, in combination; borehole apparatus adapted for traverse through an earth borehole and including an acoustic transmitter and a pair of acoustic receivers spaced a fixed unit distance each from the other and spaced respective fixed distances from said transmitter and each effective to translate a received acoustic signal to an equivalent electric wave; suspension means connected to said borehole apparatus including a conductor cable for suspending and traversing said borehole apparatus in an earth borehole and for conducting electric pulses from said borehole apparatus to a location outside the borehole; cable controlling means for moving a suspending portion of said cable in traversing movements along an extent of said borehole; means responsive to longitudinal traversing movement of said suspending portion of said cable through each of successive increments of said unit distance in said borehole to operate said acoustic transmitter once for each unit distance of traverse to produce an acoustic signal receivable in turn by each of said acoustic receivers for translation thereby into a pair of equivalent electric waves; conversion means connected to receive said pair of equivalent electric waves and to convert each pair of equivalent electric waves produced by said acoustic receivers to a corresponding pair of time-spaced electric pulses the time interval between the first and second pulses of which is substantially proportional to the travel time of said acoustic signal through a length of borehole wall equal to the said fixed unit distance between said receivers, and to apply said electric pulses to said cable for transmission to said location; and operable means at said location connected to said cable for receiving and translating the said electric pulses into indications of the velocities of propagation of said acoustic signal through respective unit distances in the borehole-encircling earth longitudinally alongside the borehole.

4. A system as in claim 3 wherein said operable means at said location includes means connected to said cable to produce an electrical quantity whose value is directly proportional to the time interval between the first and second of a given pair of said electric pulses; and means responsive to said electrical quantity to form a graphical representation of the magnitude of said electrical quantity.

5. A method of acoustic logging of the formations encircling an earth borehole comprising: generating and transmitting through an individual unit length of the formation parallel to such borehole an acoustic wave; determining the time interval required for said acoustic wave to travel through the borehole encircling formation such unit distance parallel to the borehole; producing a physical quantity having a magnitude mathematically related to such time interval; repeating the preceding procedure once for and at each such unit length of an extent of the borehole, to provide a series of said physical quantities; and forming an individual record of the magnitude of each of said quantities, related to its respective individual unit distance along the borehole and concurrently with the formation of the individual records of the magnitudes of said quantities, progressively deriving and adding the values of the respective time intervals as they are determined; and concurrently with such progressive addition, forming a progressive graphical record of the total values concurrently with the formation of the individual records of the magnitudes of said quantities, progressively deriving and adding the values of the respective time intervals as they are determined; and concurrently with such progressive addition, forming a progressive graphical record of the total values.

6. A method of acoustic logging of the formations encircling an earth borehole along an extent of such earth borehole, comprising: traversing such extent of such borehole; during such traverse generating a plurality of acoustic waves, one at each of a plurality of levels spaced unit distance apart along such extent of borehole; detecting arrival of each of such waves at each of a pair of detecting stations substantially one unit distance apart longitudinally of the borehole while maintaining each of such detecting stations spaced from the wave generating level, for each wave generated; producing an electrical pulse coincident with the arrival of each of such waves at each of such pair of detecting stations to produce pairs of such electric pulses; producing a train of regularly recurring time-measuring electric pulses, one train for each pair of electric pulses and of time duration equal to the interval between the pulses of the respective pair of pulses; for each such interval, electrically integrating the pulses of the corresponding train of pulses to produce an electrical quantity; for each such interval, producing a second electrical quantity substantially equal to the reciprocal of the first-named electrical quantity, to provide an electrical quantity representing the velocity of the respective acoustic wave at the respective pair of detecting stations; and for each such interval producing a graphical representation of said second electrical quantity.

7. A method according to claim 6 including: progressively electrically integrating the electrical quantity representing each respective train of electric pulses with all previously integrated electrical quantities representing previous trains of electric pulses, to provide an electrical quantity proportional to the total electrical quantity value of all such trains of electric pulses; and forming a second graphical representation of the progressively integrated electrical quantity.

8. A method of acoustic logging of the formations encircling an earth borehole along an extent of such earth borehole, comprising: generating a plurality of acoustic waves, one at each of a plurality of levels along such extent of borehole; detecting arrival of each of such waves at each of a pair of detecting stations spaced a fixed distance apart longitudinally of the borehole; producing an electrical signal coincident with the arrival of each of such waves at each of such pair of detecting stations to produce pairs of such electric signals; producing a train of regularly recurring time-measuring electric waves, one train for each pair of electric signals and of time duration equal to the interval between the signals of the respective pair of signals; for each such interval, digitally counting the number of waves of each train of waves; and for each such interval producing a graphical representation of a function of said number of waves counted.

9. A method of acoustic logging of the formations encircling an earth borehole, comprising: in succession generating an individual acoustic wave at each of a plurality of levels unit distance apart along an extent of such borehole; immediately following generation of each such acoustic wave, detecting the arrival of the acoustic wave at each of two detecting stations maintained a fixed distance apart longitudinally of the borehole at a substantially constant distance from the source of the acoustic waves; producing an electric signal representing and substantially coincident in time with the detection of the arrival of each acoustic wave, one signal for each detecting station, to produce pairs of time-spaced electric signals the time interval between which is representative of the time of travel of the respective acoustic wave through the formations encircling the detecting stations at that time; transmitting said pairs of signals to an operating location; producing at said operating location a plurality of series of regularly recurring time-measuring electric waves, one series for each of said pair of signals and of time duration equal to the interval between the signals of such pair of signals; for each such interval electrically digitally counting the number of waves of each train of waves; electrically adding the counts for all the preceding series of time-measuring electric waves with each newly produced series to provide a total count representing the total value of all of said time-measuring electric waves and indicative of the total time of travel of an acoustic wave through the borehole encircling formations along the traversed extent of borehole; and substantially continuously recording the value of the total count relative to distance traversed, to provide a record of such value at any and all acoustic wave generating levels.

10. A method of acoustic logging of the formations encircling an earth borehole, comprising: in succession generating an individual acoustic wave at each of a plurality of levels unit distance apart along an extent of such borehole; immediately following generation of each such acoustic wave, detecting the arrival of the acoustic wave at each of two detecting stations maintained a fixed distance apart longitudinally of the borehole at a substantially constant distance from the source of the acoustic waves; producing an electric signal representing and substantially coincident in time with the detection of the arrival of each acoustic wave, one signal for each detecting station, to produce pairs of time-spaced electric signals the time interval between which is representative of the time of travel of the respective acoustic wave through the formations encircling the detecting stations at that time; transmitting said pairs of signals to an operating location; producing at said operating location a plurality of series of regularly recurring time-measuring electric waves, one series for each of said pair of signals and of time duration equal to the interval between the signals of such pair of signals; for each such interval electrically digitally counting the number of waves of each train of waves; electrically adding the counts for all the preceding series of time-measuring electric waves with each newly produced series to provide a total count representing the total value of all of said time-measuring electric waves and indicative of the total time of travel of an acoustic wave through the borehole encircling formations along the traversed extent of borehole; substantially continuously recording the value of the total count relative to distance traversed, to provide a record of such value at any and all acoustic wave generating levels; and simultaneously producing a graphical representation of a function of said number of waves counted for each such interval.

11. In an acoustic well logging system, apparatus for positively identifying the time of first arrival of acoustic energy at a receiving transducer of acoustic to electrical energy in a subsurface instrument and utilizing such positive identification as a determination of one limit of a measured time interval, said apparatus comprising first means responsive to the first arrival of said electrical energy to produce an electrical pulse of relatively fast rise time in said subsurface instrument, second means connected to said first means to transmit said pulse to the surface of the earth, and third means comprising a time interval measuring means at the surface of the earth connected to said second means and responsive to said pulse as a determination of one limit of a time interval being measured.

12. In an acoustic well logging system, apparatus for positively identifying the time of first arrival of acoustic energy at a receiving transducer of acoustic to electrical energy in a subsurface instrument said apparatus comprising first means responsive to the first arrival of said electrical energy to produce an electrical pulse in said subsurface instrument, second means connected to said first means to transmit said pulse to the surface of the earth, and third means at the surface of the earth connected to said second means for utilization of said pulse as an indication of the time of arrival of acoustic energy at said transducer, said first means comprising a capacitor, means connected to said capacitor for charging said capacitor, a normally non-conducting grid-controlled gas discharge tube connected in series with said capacitor, means connected to said receiving transducer for applying a signal derived from the said receiving transducer to the control grid of said grid-controlled gas discharge tube to cause said capacitor to discharge through said tube, and means connected to said controlled tube for deriving an electrical pulse from said discharge.

13. In an acoustic well logging system including subsurface apparatus having a repetitively energized transmitter of acoustic energy and two receiving transducers of acoustic to electrical energy disposed in fixed relation thereto, apparatus for positively identifying the time interval between the respective first arrivals of acoustic energy at said two receiving transducers following energization of said transmitter, said apparatus comprising first means responsive to the first arrival of said electrical energy from said respective receiving transducers to produce a pair of respective electrical pulses of relatively fast rise time in said subsurface instrument spaced in time by the interval between the respective first arrivals at said two receiving transducers, second means connected to said first means to transmit said pulse pair to the surface of the earth, and third means at the surface of the earth connected to said second means for utilization of said pulse pair as an indication of the time interval between the respective first arrivals of acoustic energy at said two receiving transducers.

14. In an acoustic well logging system including subsurface instrumentation having a repetitively energized transmitter of acoustic energy and two receiving transducers of acoustic to electrical energy disposed in fixed relation thereto, apparatus for positively identifying the time interval between the respective first arrivals of acoustic energy at said two receiving transducers following energization of said transmitter, said apparatus comprising first means responsive to the first arrival of said electrical energy from said respective receiving transducers to produce a pair of respective electrical pulses in said subsurface instrument spaced in time by the interval between the respective first arrivals at said two receiving transducers, second means connected to said first means to transmit said pulse pair to the surface of the earth, and third means at the surface of the earth connected to said second means for utilization of said pulse pair as an indication of the time interval between the respective first arrivals of acoustic energy at said two receiving transducers, said first means comprising first and second capacitors, means connected to said capacitors for charging said capacitors, first and second normally non-conducting grid-controlled gas discharge tubes each connected in series with one of said capacitors, means connected to said receiving transducers for applying signals derived from each of said two receiving transducers to the control grid of one of said grid-controlled gas discharge tubes to cause one of said capacitors to discharge through the one of said tubes connected thereto, and means connected to said controlled tubes for deriving a pair of electrical pulses from the discharge of both of said two tubes.

15. The apparatus of claim 14 including means connected to said means for applying signals for disabling said means for applying signals for a predetermined time interval upon energization of said transmitter.

16. A method of acoustic well logging comprising repetitively generating acoustic waves in a borehole in the earth, detecting arrival of each of such waves at each of a pair of detecting stations spaced a fixed distance apart longitudinally of said borehole by producing related electrical signals, deriving an electrical pulse from the first portion of the electrical signals produced from such detection at each of said stations, transmitting the pair of electrical pulses thereby produced from each of such waves to the surface of the earth, and there utilizing each of said pulse pairs as a measure of the time interval between the respective first arrivals of each of said acoustic waves at said two stations.

17. A method of acoustic well logging comprising the steps of charging a pair of capacitors in a borehole in the earth, generating an acoustic wave in said borehole, detecting arrival of said wave at each of a pair of detecting stations spaced a fixed distance apart longitudinally of said borehole by producing related electrical signals, successively discharging said capacitors upon the first production of the electrical signals produced from such detection at a respective one of said stations to produce a pair of electrical pulses spaced in time by the interval between the respective first arrival of said wave at said two stations, transmitting the pair of electrical pulses thereby produced to the surface of the earth, and there utilizing said pulse pairs as a measure of the time interval between the respective first arrivals of said acoustic wave at said two stations.

References Cited in the file of this patent

UNITED STATES PATENTS

| | | |
|---|---|---|
| 2,238,991 | Cloud | Apr. 22, 1941 |
| 2,301,195 | Bradford | Nov. 10, 1942 |
| 2,566,078 | Bliss | Aug. 28, 1951 |
| 2,651,027 | Vogel | Sept. 1, 1953 |
| 2,665,411 | Frady | Jan. 5, 1954 |
| 2,704,364 | Summers | Mar. 15, 1955 |
| 2,708,485 | Vogel | May 17, 1955 |
| 2,768,701 | Summers | Oct. 30, 1956 |
| 2,780,795 | Ambrosio | Feb. 5, 1957 |
| 2,905,258 | Broding | Sept. 22, 1959 |